Feb. 7, 1933.   R. M. BURNS   1,896,478
TREATING WOOD AND PREVENTING CORROSION OF CABLES
Filed Aug. 18, 1928
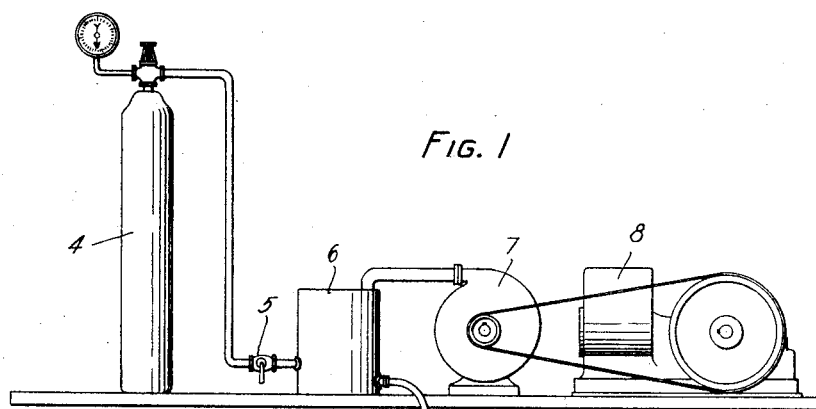
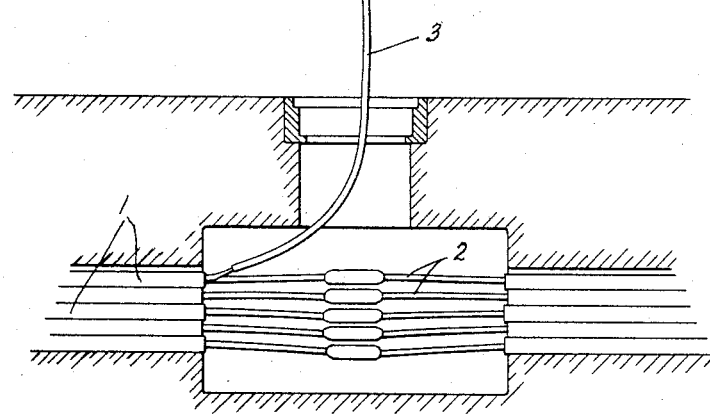
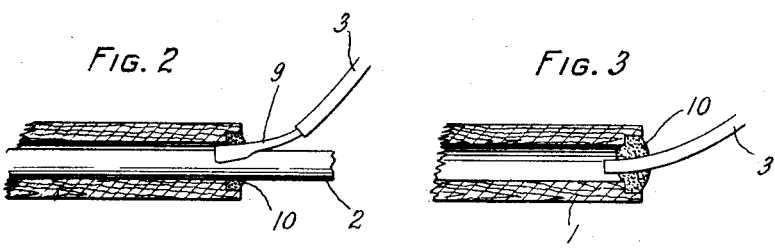
INVENTOR
ROBERT M. BURNS
BY
J. W. Schmied
ATTORNEY Patented Feb. 7, 1933

1,896,478

UNITED STATES PATENT OFFICE

ROBERT M. BURNS, OF BROOKLYN, NEW YORK, ASSIGNOR TO BELL TELEPHONE LABORATORIES, INCORPORATED, OF NEW YORK, N. Y., A CORPORATION OF NEW YORK

TREATING WOOD AND PREVENTING CORROSION OF CABLES

Application filed August 18, 1928. Serial No. 300,545.

This invention relates to a method of treating conduits and cables contained therein. A primary object of the invention is to prevent corrosion of sheathings of signaling cables laid in conduits.

A further object is to so treat conduits as to put them into a condition such that cables laid therein at the time, or to be laid afterwards, will not be corroded.

Large amounts of wooden ducts are employed in various parts of the country as containers for lead and lead-alloy covered telephone cables. In the case of certain of these a serious problem arose by virtue of the fact that the cable sheaths were becoming corroded to the extent of causing faults therein leading to failures in the conductors and other troubles.

Researches disclosed the fact that the corrosion was occurring principally in conduits made of Douglas fir (especially when not well seasoned) treated—before laying—with creosote by a process in which the wood is immersed in creosote oil and subjected to a minimum vacuum of 20" of mercury and to temperatures ranging between 190° F. and 200° F. until the moisture contained became reduced to approximately the fibre saturation point, after which pressure was applied until the timber had absorbed a sufficient amount of creosote oil, after which the pressure was removed and the retorts emptied of preservative and subjected to a vacuum of 20" of mercury for about two hours under an average temperature of 160° F. Theory and investigation indicate that the temperatures incident to impregnation may increase the acidic content of the wood.

However, the purposes and objects of the invention are not limited to the treatment of creosoted Douglas fir conduits or to conduits of the same or other woods creosoted by the same or other processes. It is of general application to corrosive conduit structures.

After extensive investigations and a chemical examination of the atmosphere contained in the corrosive conduits it was inferred that the corrosion resulted from a chemical reaction involving volatile organic acids. It is supposed that these acids are derived from the wood of the conduit and in particular it appears that green Douglas fir wood contains considerably larger quantities of such acid than do some other varieties of wood used for underground conduits.

Extensive experiments were then carried on for the purpose of determining how the sheathed cables laid in conduits observed to be corrosive could be saved and also how very extensive conduit systems not yet having cables drawn into them could be saved for practical utilization.

The solution finally arrived at as the best palliative treatment was that of circulating ammonia gas through the affected conduit.

A suitable apparatus for this purpose consisted of a large capacity blower operated by a gasoline engine, a mixing tank, with necessary connections and an outlet through a manifold for distributing the mixture of air and ammonia to the ducts. A tank of liquid ammonia was connected to the mixing tank through a flow meter. For mobility the entire apparatus was mounted on a motor-driven truck. The air-ammonia mixture found most suitable contained about 2% ammonia and this was used in treating a large amount of the affected creosoted wood conduit. Other percentages of ammonia will produce the desired results. The result of the treatment as so far observed has been that the trouble due to corrosion has practically ceased. In any case it is deemed that one or more retreatments will suffice to correct the corrosive condition in even the most badly affected conduits.

It is believed that the corrosion results from the interaction of accumulations of acetic acid or equivalent acids with oxygen, carbon dioxide and water vapor upon the lead. The chemical reaction involved is believed to be the same as that involved in the production of "white lead". This reaction consists in the formation of lead acetate by the action of acetic acid and oxygen on lead and the conversion of this product into a basic lead carbonate with accompanying liberation of acetic acid which then repeats the process cyclically. The ammonia gas is thought to act by neutralizing the acetic acid with resultant formation of ammonium acetate, a non-voltatile salt.

Apparatus for practicing the invention is shown in the drawing in which

Fig. 1 discloses a complete system and Figs. 2 and 3 details of sealing the ammonia supplying hose connection into conduits.

In Fig. 1 the conduits 1 containing cables 2 are supplied with gas through the hose 3. Ammonia gas stored under pressure in a tank 4 passes through valve 5 into a mixing tank 6 where it is mixed with air supplied through the blower 7 by gas engine 8. This apparatus is disclosed in a purely diagrammatic manner with omission of the details of pressure measuring and flow measuring devices, etc.

Fig. 2 shows a form of nozzle 9 for use in treating conduit containing cable. The nozzle is sealed into the conduit with wax or other suitable substance 10.

In Fig. 3 no special nozzle is necessary and the hose connection is sealed directly into the conduit with the wax.

The treatment is equally applicable to conduit ducts already containing cables and those into which cables have not yet been drawn. It is deemed that the method is applicable to any conduit system in which corrosion occurs as a result of an accumulation of corrosive acids.

A modified method has been used to treat conduit before laying. After cresoting the conduit was placed in retorts and the retorts filled with ammonia.

A further modified method is to add to the regular stock creosote oil, used to impregnate the conduit, a quantity of ammonia or a sufficient amount of coal tar bases to neutralize the acids of the treated wood. Coal tar bases, as here referred to, are basic substances occurring in coal tar, bone tar or similar substances which can be separated by methods well-known.

What is claimed is:

1. The method of treating underground conduits containing or designed to contain cables sheathed with lead compositions and also containing substances promoting deterioration of the sheath for the purpose of preventing deterioration of the sheath by corrosion which comprises passing ammonia gas through the conduit.

2. The method of preventing interaction between the lead sheath and corroding agents such as water, acids, carbon dioxide, oxygen, which are contained in the medium surrounding a lead sheathed cable laid in a wooden duct impregnated with creosote oil or a similar impregnating agent, which method comprises causing an alkaline gas such as ammonia to flow through said duct.

In witness whereof, I hereunto subscribe my name this 16th day of August, 1928.

ROBERT M. BURNS.